(12) United States Patent
Busayarat

(10) Patent No.: US 10,360,154 B2
(45) Date of Patent: Jul. 23, 2019

(54) CACHE MAP WITH SEQUENTIAL TRACKING FOR INVALIDATION

(71) Applicant: Home Box Office, Inc., New York, NY (US)

(72) Inventor: Sata Busayarat, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 15/856,353

(22) Filed: Dec. 28, 2017

(65) Prior Publication Data

US 2018/0121363 A1    May 3, 2018

Related U.S. Application Data

(63) Continuation of application No. 15/081,812, filed on Mar. 25, 2016.

(51) Int. Cl.
| | |
|---|---|
| G06F 12/121 | (2016.01) |
| G06F 12/0891 | (2016.01) |
| G06F 12/0864 | (2016.01) |
| G06F 12/123 | (2016.01) |

(52) U.S. Cl.
CPC ...... *G06F 12/0891* (2013.01); *G06F 12/0864* (2013.01); *G06F 12/121* (2013.01); *G06F 12/123* (2013.01); *G06F 2212/1016* (2013.01)

(58) Field of Classification Search
None
See application file for complete search history.

(56) References Cited

U.S. PATENT DOCUMENTS

| | | |
|---|---|---|
| 6,480,950 B1 | 11/2002 | Lyubashevskiy et al. |
| 7,266,642 B2 | 9/2007 | Shen et al. |
| 2004/0073630 A1 | 4/2004 | Copeland et al. |
| 2007/0113042 A1 | 5/2007 | Adcock |

OTHER PUBLICATIONS

Office Action dated Jul. 16, 2018 for U.S. Appl. No. 15/081,812, 8 pages.
Office Action dated Jul. 27, 2017 for U.S. Appl. No. 15/081,812, 11 pages.
Office Action dated Jan. 9, 2018 for U.S. Appl. No. 15/081,812, 8 pages.
Office Action dated Jan. 4, 2019 for U.S. Appl. No. 15/081,812, 11 pages.

*Primary Examiner* — Brian R Peugh
(74) *Attorney, Agent, or Firm* — Amin, Turocy & Watson, LLP

(57) ABSTRACT

The described technology is directed towards efficiently invalidating cached data (e.g., expired data) in a hash-mapped cache, e.g., on a timed basis. As a result, data is able returned from the cache without checking for whether that data is expired, (if desired and acceptable), because if expired, the data is only briefly expired since the last invalidation run. To this end, a data structure such as a linked list is maintained to track information representative of hash-mapped cache locations of a hash-mapped cache, in which the information tracks a sequential order of entering data into each hash-mapped cache location. An invalidation run is performed on part of the hash mapped cache, including using the tracking information to invalidate a sequence of one or more cache locations, e.g., only the sequence of those locations that contain expired data.

20 Claims, 10 Drawing Sheets

CACHE MAP WITH SEQUENTIAL TRACKING FOR INVALIDATION

CROSS-REFERENCE TO RELATED APPLICATION

The present application is a continuation of copending U.S. patent application Ser. No. 15/081,812, filed on Mar. 25, 2016.

BACKGROUND

Conventional caches provide a fast way to access data. One typical type of cache uses a hash function related to a request for data to determine a cache location corresponding to the requested data, which facilitates constant time lookup. If the requested data is found in the cache, the data is returned from the cache. If not, (that is, there is a cache miss), the data is retrieved from another source (e.g., a physical data store), returned in response to the request and written into the cache at the appropriate location.

Each data entry in the cache is typically associated with an expiration value, such as a time-to-live or timestamp value. When a request for cached data is received but the data is determined to be expired, the expired data is typically treated as a cache miss, resulting in returning the data from the other source and updating the cache entry with the non-expired data and a new expiration value.

While this expiry mechanism works well for conventional caches like internet content and Domain Name System caches, in other scenarios this mechanism may not be appropriate. For example, FIFO (first in, first out) caches that handle a high volume of requests may operate more efficiently without checking the expiration value for each request.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards efficiently invalidating cached data (e.g., expired data) in a hash-mapped cache, including so that in one or more example implementations, data can be returned from the cache without checking for whether that data is expired. One or more aspects are directed towards maintaining information representative of hash-mapped cache locations of a hash-mapped cache, in which the information tracks a sequential order of entering data into each hash-mapped cache location. An invalidation run is performed on at least part of the hash mapped cache, including using the information representative of the hash-mapped cache locations to invalidate a sequence of one or more cache locations.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
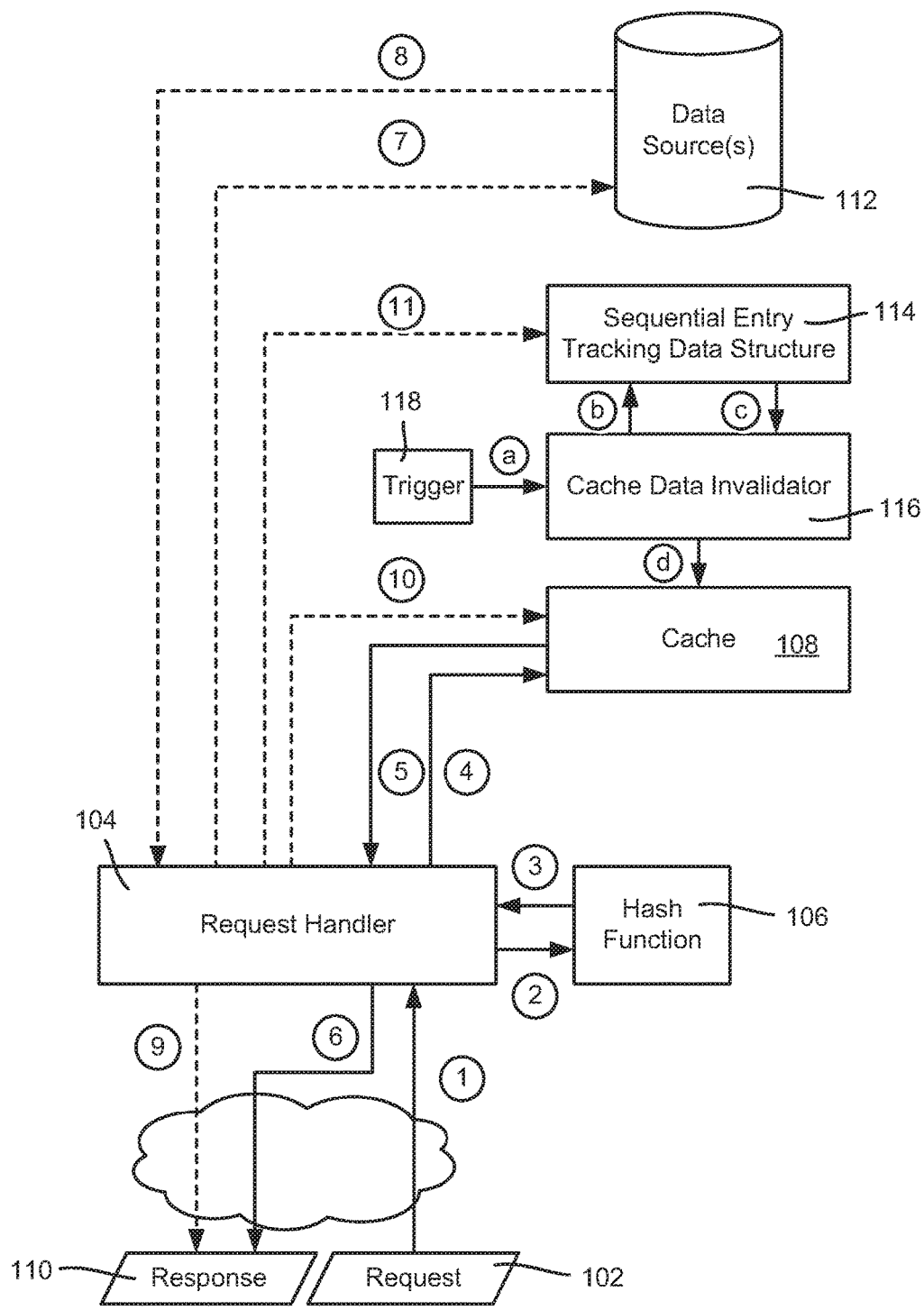
FIG. 1 is an example representation of components that handle requests for data including via a cache that is sequentially tracked for invalidation, according to one or more example implementations.

Various aspects of the technology described herein are generally directed towards separately and occasionally invalidating certain cache entries based upon invalidation criterion, such as invalidating expired entries. In general, a separate invalidation process rapidly invalidates expired cache entries by only checking for possibly expired entries rather than traversing the entire cache to find which ones, if any, are expired. To this end, a data structure such as a doubly linked list is used to track the sequential ordering of cache entry locations that are dispersed (via a hash function) among non-sequential locations in the cache.

During invalidation, the invalidation process, (e.g., which may be run on a configurable and/or best effort basis), may start with the oldest entry, find its location in the cache via the linked list, and invalidate (e.g., writes NULL into) the entry if expired (or ends if not expired). If the oldest entry is invalidated, the invalidation process advances its position in the doubly linked list to sequentially check each cache entry in time order for expiration, invaliding each expired one until a cache entry/location is reached that has not expired, at which time the invalidation process ends until run again at some later time. In one or more implementations, the invalidation may be asynchronous, and in general invalidation does not directly impact the lookup performance (other than to the extent the invalidation process may share machine resources if the invalidation is run on the same machine as the cache lookup is performed).

As will be understood, the use of the separate invalidation process avoids having to check the expiration of each request for cached data; the cached data is either present or not (e.g., NULL). At the same time, the invalidation process is fast because the linked list is used to find cache locations, and indeed, is on the order of ten times faster than traversing the entire cache to invalidate expired entries.

In one or more implementations, the technology described herein thus includes separately tracking the sequential order of the cached data, and using a doubly linked list of pointers to corresponding cache entries. To invalidate a time-ordered set of entries in the cache, which are distributed (pseudo-randomly) throughout the cache according to the hash function, the oldest entry in the linked list is tracked and the linked list is accessed. Then, the cache pointers in this section of the linked list are used to quickly locate the cache entries for which invalidation is desired.

Note that one or more implementations use a doubly linked list as the tracking data structure, in which along with a forward pointer to the next node, the nodes have a back pointer to each one's previous node, which supports on-demand random-access cache invalidation, e.g., explicit invalidation of any cache entry or entries. However, alternative implementations in which such on-demand random-access cache invalidation is not appropriate may use a circular, singly linked list.

It should be understood that any of the examples herein are non-limiting. For instance, the invalidation process is not limited to invalidating actually expired entries, and for example may invalidate any entries, such as those already expired as well as those which will expire in X seconds. Thus, invalidation can be performed on any time window, e.g., invalidate anything with a TTL (time-to-live) value less than Z, or between X and Y and so on. It is also feasible for the invalidation process to invalidate some amount of cache space based upon number of entries (or possibly cache size) rather than based solely on (or even at all on) a TTL or a timestamp value, e.g., invalidate the oldest fifty percent of the cache.

As such, the technology described herein is not limited to any particular embodiments, aspects, concepts, structures, functionalities or examples described herein. As one example, a FIFO cache is one type of cache exemplified herein, however the technology is not limited to FIFO caches. Similarly, a (doubly) linked list is one suitable type of sequential cache entry tracking data structure, but the technology is not limited to linked lists, as any suitable array/data structure may be used. Rather, any of the embodiments, aspects, concepts, structures, functionalities or examples described herein are non-limiting, and the technology may be used in various ways that provide benefits and advantages in computing and data caching/cache management in general.

FIG. 1 shows an example block diagram in which various aspects of the technology described herein may be implemented. In FIG. 1, a request 102 for data is received by a request handler 104, e.g., a front end component of an internet service or the like. Note that in general, some of the operations represented in FIG. 1 are identified via labeled arrows; e.g., the request 102 corresponds to labeled arrow one (1).

Using data (e.g., an identifier) in the request, the request handler 104 uses a hash function 106 (labeled arrows two (2) and three (3)) to map to a location in a cache 108 and accesses the cache 108, e.g., using the hash value as an index (labeled arrow four (4)). Labeled arrow five (5) represents the cache returning the data if cached or a cache miss if data is not cached at that location.

If the requested data is cached, the request handler 104 returns the data in a response 110 to the request 102, corresponding to labeled arrow (6); otherwise there is no response returned at this time, as the requested data needs to be obtained elsewhere. Note that the arrows labeled one (1) through six (6) are solid lines, indicating a first set of example operations that is often performed to fully satisfy a request.

Alternatively, if the requested data is not in the cache 108, further example operations represented in FIG. 1 correspond to dashed arrows labeled seven (7) through eleven (11). In general, for data not in the cache, the request handler 104 obtains the data from one or more data sources 112, (which also may include one or more caches), as represented via labeled arrows seven (7) and eight (8), and returns the data in in a response 110 to the request 102 (arrow nine (9)).

As represented by the arrow labeled ten (10), the request handler 104 (or other suitable component) writes the data into the cache at the location corresponding to the previously computed hash function. Further, an expiration value (e.g., a TTL value or timestamp) is typically written into the cache 108 along with the data in one or more implementations.

As described herein, the request handler 104 (or other suitable component) also updates a sequential entry tracking data structure 114, e.g., a linked list, as represented by the arrow labeled eleven (11). As will be understood, this data structure 114 tracks the order of locations to which data is entered into the cache 108, and, for example, comprises an array that for each cache data entry maintains a pointer to the data entry's corresponding hash-mapped location.

Figure 2:
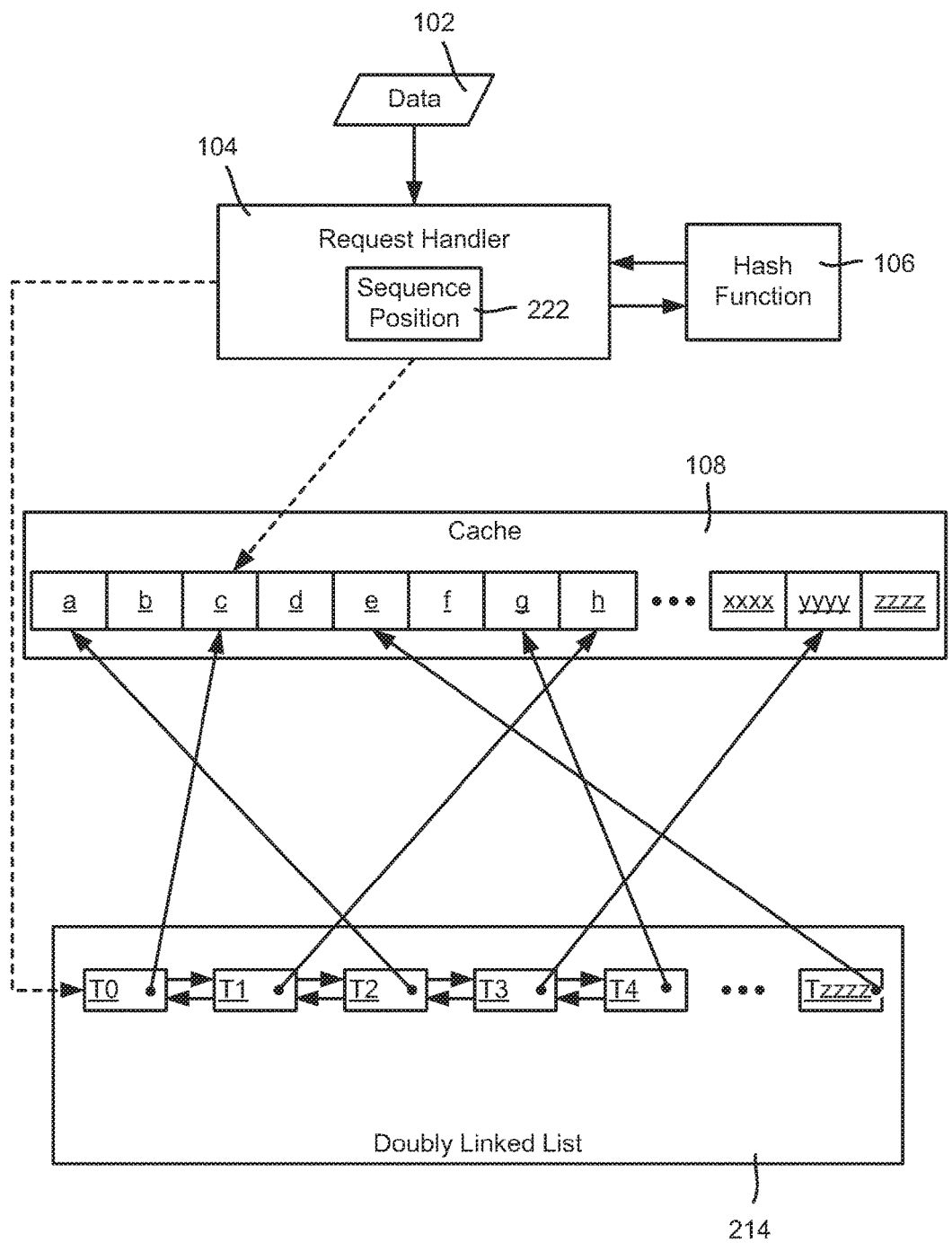
FIG. 2 is a block diagram showing an example of updating a cache while maintaining a data structure (e.g., a doubly linked list) that sequentially tracks the order of cached data entries, according to one or more example implementations.

An example of one such data structure 114 is represented as a doubly linked list 214 in FIG. 2. As can be seen, each time data is entered into the cache 108, the request handler 104 adds a pointer to the cache location at the current linked list sequence array position value 222, and increments the (moves to the next) sequence array position value 222. Thus, the cache locations are maintained sequentially in the linked list 214, e.g., represented by indices T1-Tzzz. In the example of FIG. 1, the linked list is a doubly linked list; however this is only one example data structure possibility. Note that the linked list entries need not maintain the time of entry into the cache, only the order of entry. Thus, in the example of FIG. 2, along with the forward and back pointers, one linked list entry T0 points to cache data location c, T1 points to cache location h, T2 to cache location a, and so on. However, an alternative is to have the data structure 114 maintain an expiration value rather than (or in addition to) having an expiration value in the cache. In any event, there is an expiration value (TTL or timestamp) associated with each cached data entry.

Returning to FIG. 1, a process represented as a cache data invalidator 116 is triggered (block 118, arrow labeled (a)) to invalidate a "sequence" of zero or more cached data entries, which in many implementations correspond to (but are not limited to) those that are expired. To this end, the cache data invalidator 116 accesses the sequential entry tracking data structure 114 (arrows (b) and (c)), based upon data representing the oldest data entry, and using the pointer location to that oldest location begins invalidating any expired entries (arrow (d)). Note that the oldest entry may not be expired, in which event any more recent entries are also not expired, (assuming an implementation in which expiration TTL values are the same). To be of much use with a cache of any significant number of entries, the invalidator 116 often will have a fairly large sequence to invalidate.

If expired, the cache entry at the oldest location is invalidated, e.g., set to NULL, and the process continues with the next sequential entry based upon the next position in the sequential entry tracking data structure 114. Invalidation continues for any expired data entry; once one is reached that is not expired, then the more recent ones are also not expired, and the cache data invalidator process ends, after saving the current position in the tracking data structure 114 for starting the next invalidation run.

Figure 3:
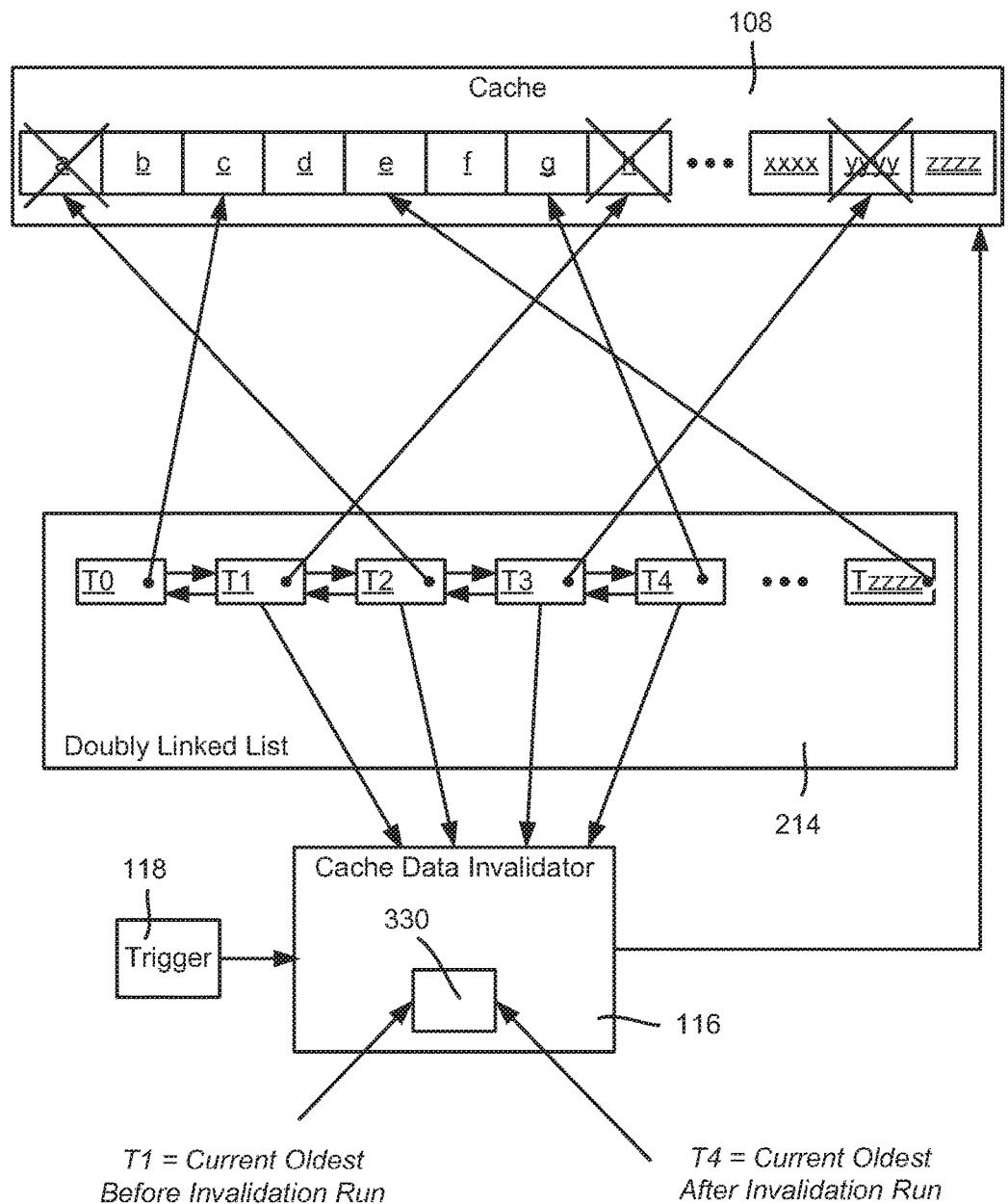
FIG. 3 is a block diagram showing an example of using a data structure (e.g., a doubly linked list) that sequentially tracks the order of cached data entries to perform invalidation of cached data, according to one or more example implementations.

FIG. 3 shows a more specific example, in which the cache data invalidator 116 starts at the oldest data entry according to the current position in the linked list, which in this example is T1; (e.g., T0 was invalidated in a previous invalidation run, or the linked list is circular and T0 is not the oldest position). For example, the cache data invalidator 116 may maintain this starting position (e.g., a pointer to the doubly linked list node) in internal object memory tracking data structure 330, or at some other accessible storage location.

When triggered, the cache data invalidator 116 accesses the linked list to quickly locate those data entries in the cache that are to be invalidated. Note that triggering may be time based, e.g., a configurable periodic value that allows trading off an acceptable level of data "staleness" versus the consumption of computing resources (e.g., processing time, particularly in single-threaded applications, such as those run in the node.js runtime environment, in which requested data is inaccessible during invalidation) to perform the invalidation run. For example, in many scenarios, data that is a couple of seconds over its expiration time is still quite acceptable to use. Thus, the cache data invalidator 116 may be triggered to run every couple of seconds. Any system employing this technology can be configured to run invalidation as desired, to tradeoff acceptable cached data staleness versus the processing needed to perform invalidation.

Notwithstanding, other triggers may be used instead of or in addition to periodic triggering of the cache data invalidator 116. For example, a database (one of possibly many data sources) may have been updated, at which time it may make sense to trigger the cache data invalidator 116 on demand (possibly with different invalidation criteria, such as to invalidate actually expired data and also any data that will expire within five minutes). Thus, virtually any criterion or criteria, including timing, may be used to trigger the cache data invalidator 116, as well as to modify any timed triggering, e.g., every two seconds during weekdays, every four seconds on weekends, and/or to dynamically adjust the frequency based upon current resource availability such as how many requests for data are coming in. Explicit invalidation of any cache entry or set of entries also may be accomplished, e.g., based upon timing, and/or one or more criteria independent of timing.

In the example of FIG. 3, the cache data invalidator 116 looks to the T1 position in the linked list 214 to determine the pointer to cache location h, which in this example is expired based upon its associated expiration value (TTL or timestamp). Thus, cache location h is invalidated, (e.g., marked NULL), as represented by the crossed "X" over that location in the cache 108.

Continuing with this example, the cache data invalidator 116 moves to the next current position, T2, obtains the pointer to cache location a, determines that this data has expired, and invalidates cache location a. The example similarly continues with T3, which corresponds to cache location yyyy, in which the invalidator 116 determines that this location's data has expired, and invalidates cache location yyyy. However, T4's corresponding location, cache location g, has not expired. Thus, the cache data invalidator 116 leaves this data in cache location g intact, and saves T4 (pointing to cache location g) as its oldest position for its next run.

Instead of using the expiration value (whether actually expired or within a time window based upon the expiration value) as the sole criterion for determining whether to invalidate a cached entry, total number of cache entries also may be used as a factor, e.g., invalidate some fraction (e.g., percentage) of the entire cache, e.g., based on total number of entries. By way of example, consider that a significant change to a database has occurred, and there are a large number of requests interested in that data. For example, at a certain time, the latest release of a popular television series episode becomes available for streaming as identified within a catalog of titles. It is predicted that many users will request the catalog at that time and shortly thereafter, and thus expiring older data, independent of its actual expiration time, may be desirable; (it may also be desirable to pre-populate the cache to some extent with certain updated data just before the release time, e.g., via a simulated request, and/or to hold actual requests until cached).

Figure 4:
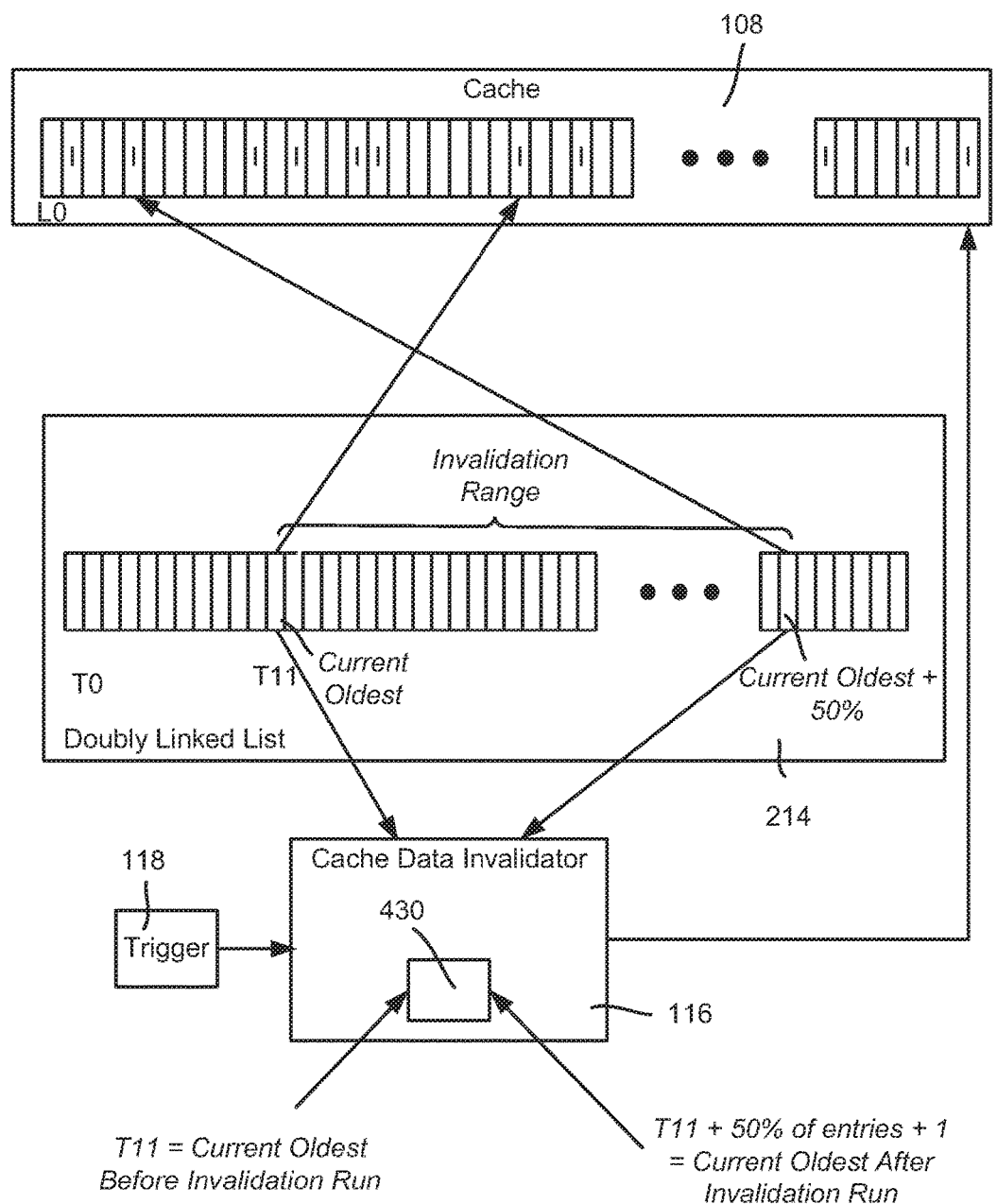
FIG. 4 is a block diagram showing an example of using a data structure (e.g., a doubly linked list) that sequentially tracks the order of cached data entries to perform invalidation of a range of cached data, according to one or more example implementations.

FIG. 4 shows the invalidation of some percentage of the cache, which in this example may be fifty percent. Because the linked list has an ordered sequence of pointers to the cached data entries, the oldest fifty percent of data entries corresponds to the same percentage of linked list positions. Thus, it is straightforward to determine a starting position in the linked list (e.g., the oldest entry, T11 in this example), compute an ending position (starting point offset plus the number of total positions times fifty percent), and invalidate from the starting linked list position to the ending position (shown as "I" in certain cache locations to represent invalidated). Once finished, the new oldest position is known to be the next one following the last invalidated one, (e.g., T11+50% of the number of positions +1). Note that percentage (or similar number of entries) based invalidation may be done in divided runs to avoid having too many pending requests for data, e.g., instead of invalidating the oldest fifty percent of the cache in a single invalidation run, invalidate the oldest ten percent of the cache for five invalidation runs in a row.

Figure 5:
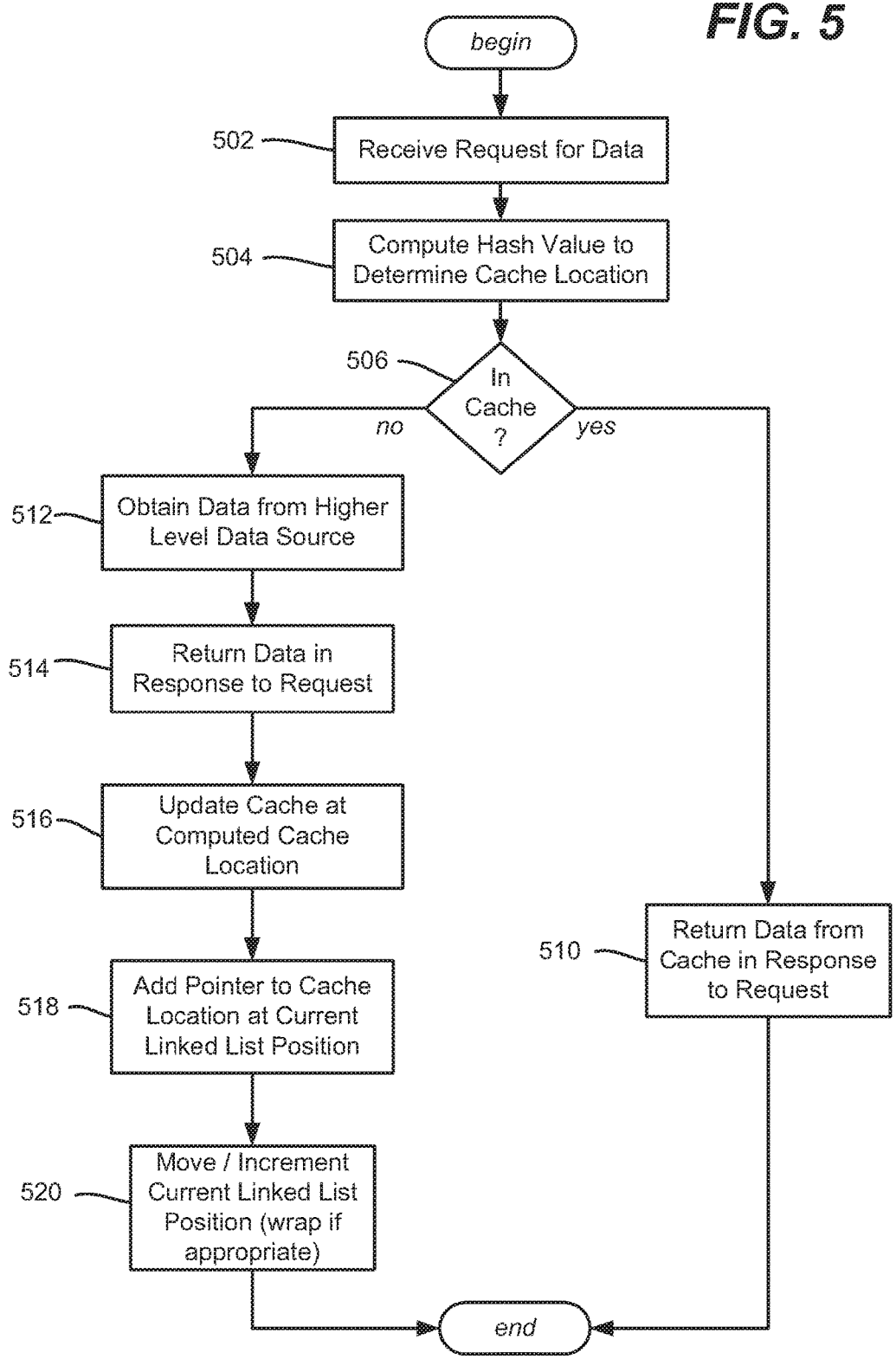
FIG. 5 is a flow diagram showing example steps that may be taken by request handler logic to serve cached data when cached or when not cached to obtain the data elsewhere, update the cache and maintain a data structure that sequentially tracks the order of cached data entries, according to one or more example implementations.

FIG. 5 is a flow diagram showing example operations of the request handler when a request is received at step 502. Step 504 represents computing the hash value to determine a cache location. Step 506 evaluates whether or not the requested data is in the cache at that location. If so, step 510 returns the data from the cache at that location in response to the request.

Note that in FIG. 5, the expiration of the cached data entry is not checked, whereby serving cached data is highly efficient. For example, when dealing with a large number of data requests, a significant amount of processing is needed to check whether each requested cache data entry is expired. However, as described herein, such cached data entries can be separately invalidated when expired, e.g., every two seconds, and thus when acceptable for a given application to receive expired data within that two second timeframe, this expiration check on each of the large number of data requests can be avoided. Notwithstanding, as described below with reference to FIG. 6, the technology described herein also may be used with applications that need an actual expiration check for any cached data.

If not found in the cache at step 506, step 512 represents obtaining the data from a higher-level data source. This may be a higher-level cache, a database, or other suitable data source, for example. Step 514 returns the data in response to the request. Step 516 updates the cache of the computed cache location. Step 518 adds a pointer to the cache location at the current linked list position.

Step 520 increments the current linked list position, that is, moves the position to the next node pointed at from the last, previous node. In alternative implementations in which the linked list is a circular list and the current linked list position is at the end, step 520 also wraps the linked list position to the start of the linked list.

Figure 6:
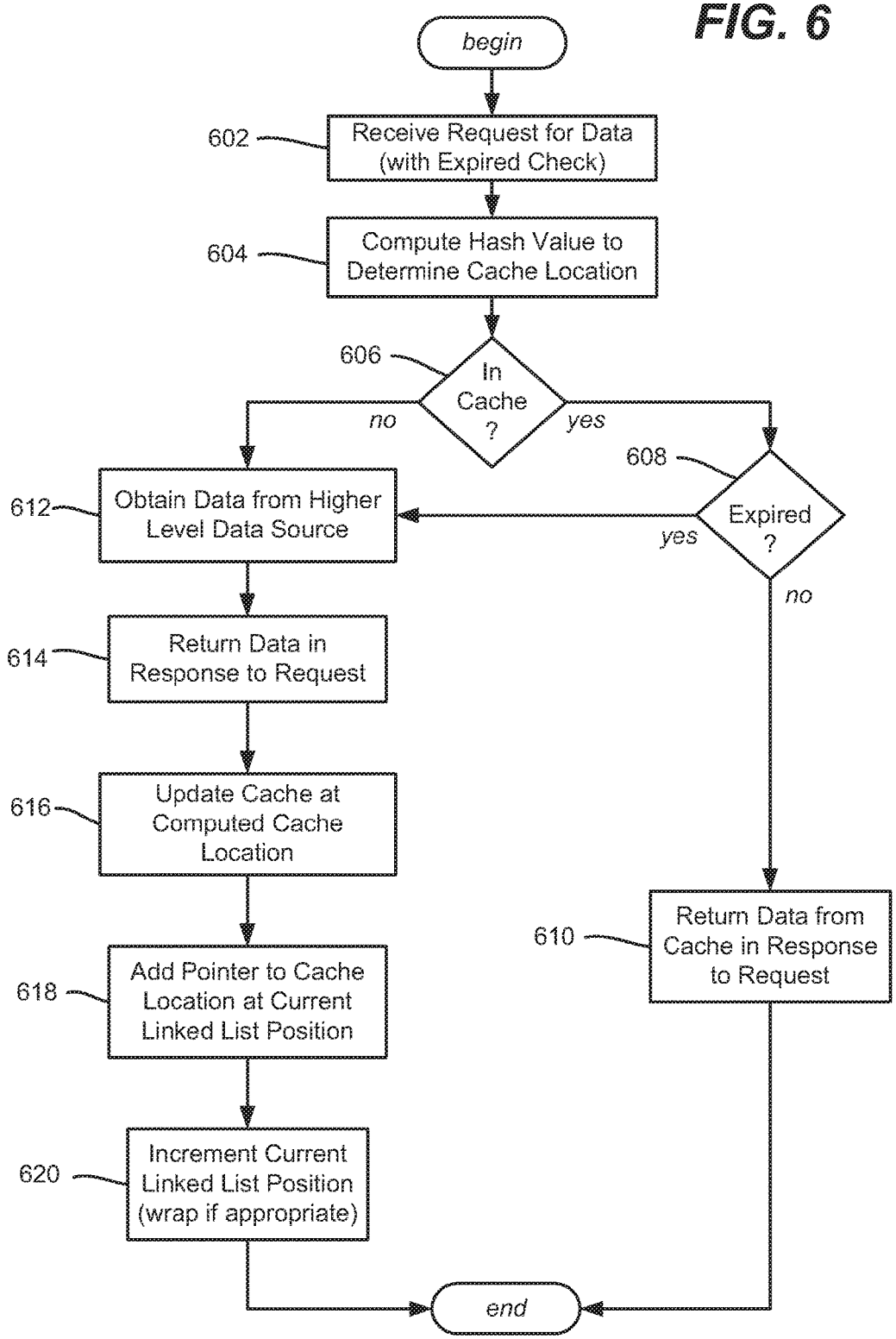
FIG. 6 is a flow diagram showing example steps that may be taken by request handler logic to serve cached data when cached and not expired, or when not cached or expired, to obtain the data elsewhere, update the cache and maintain a data structure that sequentially tracks the order of cached data entries, according to one or more example implementations.

FIG. 6 is a flow diagram showing example operations similar to those of FIG. 5 of an alternative request handler (or alternative logic within the same request handler) when a request is received (step 602). As will be understood, however, FIG. 6 differs from FIG. 5 via alternative logic that may be performed to prevent returning expired data, even if only briefly expired. For example, using the same cache that is separately invalidated by invalidation logic as described herein, certain data sensitive applications can flag a request (or all requests) as needing to check the actual expiration.

Thus, step 604 represents computing the hash value to determine a cache location, and step 606 evaluates whether or not the requested data is in the cache at that location. If so, unlike returning the data as in FIG. 5, step 608 is performed to evaluate the actual expiration value associated with the data. If not expired, step 610 returns the data from the cache at that location in response to the request.

If not found in the cache at step 606, or found but determined to be expired at step 608, step 612 represents obtaining the data from a higher-level data source. This may be a higher-level cache, a database, or other suitable data source, for example. Step 614 returns the data in response to the request.

Step 616 updates the cache of the computed cache location. Step 618 adds a pointer to the cache location at the current linked list position. Step 620 increments the current linked list position, that is, moves to the next node. As with FIG. 5, if in alternative implementations in which the linked list is a circular list and the current linked list position is at the end, step 620 also wraps the linked list position to the start of the linked list.

Figure 7:
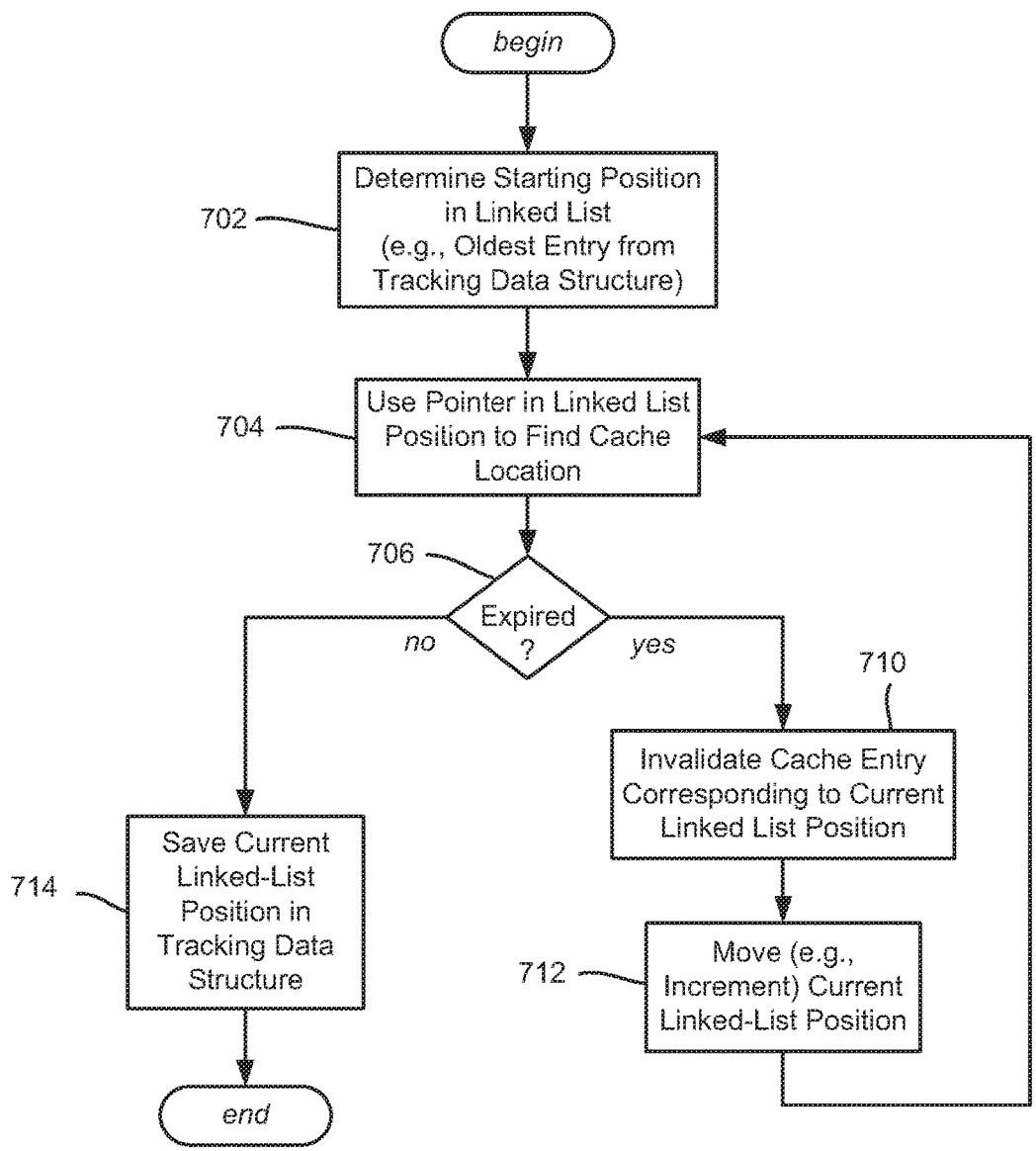
FIG. 7 is a flow diagram showing example steps that may be taken by cache data invalidator logic to invalidate any expired cache data entries, according to one or more example implementations.

FIG. 7 represents example logic of the cache data invalidator when run in an implementation in which a cache entry is invalidated if expired, otherwise the cached data is left intact and the cache data invalidator process ends. Step 702 represents determining the starting position in the linked list, which in this example is the oldest entry as maintained in the tracking data structure 330 (FIG. 3).

Step 704 obtains the pointer in the linked list at this position to find the cache location corresponding to this oldest entry. Step 706 evaluates whether the data entry has expired. If so, step 710 invalidates the cache entry corresponding to the current linked list position. Step 712 moves to the next node (e.g., increments the current linked list position) and returns to step 704 which uses the cache pointer maintained at this next position to find the cache location for the next set of data sequentially entered into the cache. Step 706 evaluates the cached data's expiration value, invalidating the cached data entry if expired. As can be seen from the logic of FIG. 7, the process continues until step 706 determines that a cached data entry has not expired. Upon such a determination, the invalidation process saves the current linked list position in the tracking data structure 330, and the invalidation process ends.

As can be readily appreciated, nodes that point to invalidated cache locations may be removed from the doubly linked list by manipulating the nodes' pointers. This can be done as each entry is invalidated, e.g., as part of step 712, or can be done at once, as the starting node (before being removed) has a pointer to the previous valid node and the last node (before being removed) has a pointer to the next valid node; the previous valid node is modified to point to the next valid node, and vice-versa for the back pointer.

Figure 8:
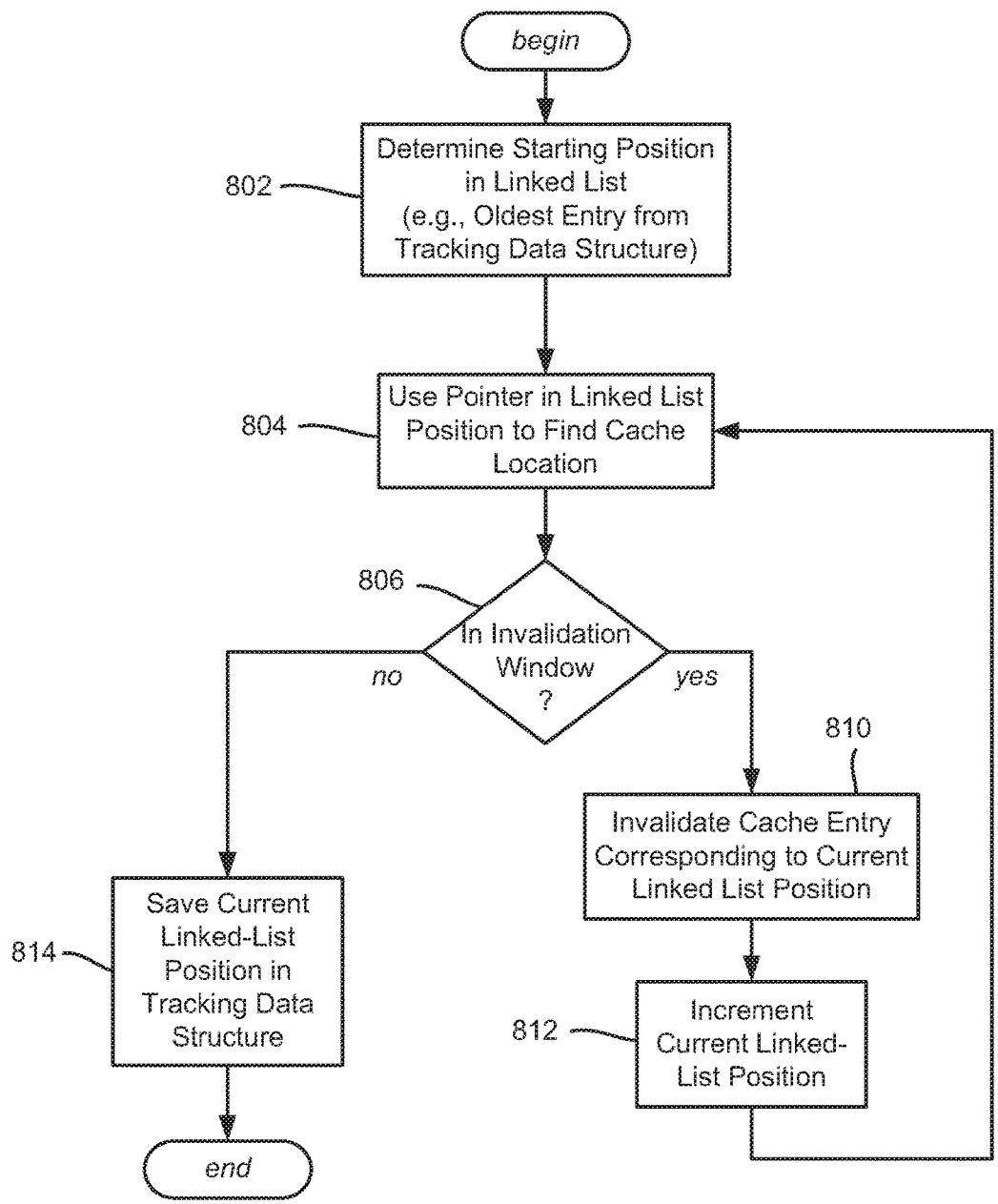
FIG. 8 is a flow diagram showing example steps that may be taken by cache data invalidator logic to invalidate any cache data entries within an invalidation time window, according to one or more example implementations.

FIG. 8 represents example logic of a cache data invalidator when running in an implementation in which a cached data entry is invalidated if within a time invalidation window. Step 802 represents determining the starting position in the linked list, which may be the oldest entry as maintained in the tracking data structure 330 (FIG. 3). However, it is feasible to start at any position, such as to find a starting point based upon a binary search of the expiration values in the cache, e.g., to invalidate a certain section of the cache having data entered therein within a certain time window.

Step 804 obtains the pointer in the linked list at this position to find the cache location corresponding to this starting cached data entry. Step 806 evaluates whether the data entry is within the invalidation window. For example. If the expiration value is a TTL (and all TTLs are the same such as 7200 seconds when inserted), then checking the remaining time (e.g., less than 3600 seconds or not) determines whether the data entry is within a one-hour invalidation window. If the evaluation value is a timestamp, the time window may be determined by subtracting from the current time (e.g., if current time minus the cached time is greater than one hour then the data entry was cached within the invalidation window).

If within the invalidation window, step 810 invalidates the cache entry corresponding to the current linked list position. Step 812 increments the current linked list position and returns to step 804 which uses the pointer maintained at this next position to find the cache location for the next set of data sequentially entered into the cache. As can be seen from the logic of FIG. 8, the process continues until step 806 determines that a cached data entry is not within the invalidation window. Upon such a determination, the invalidation process saves the current linked list position in the tracking data structure 330, and the invalidation process ends.

Figure 9:
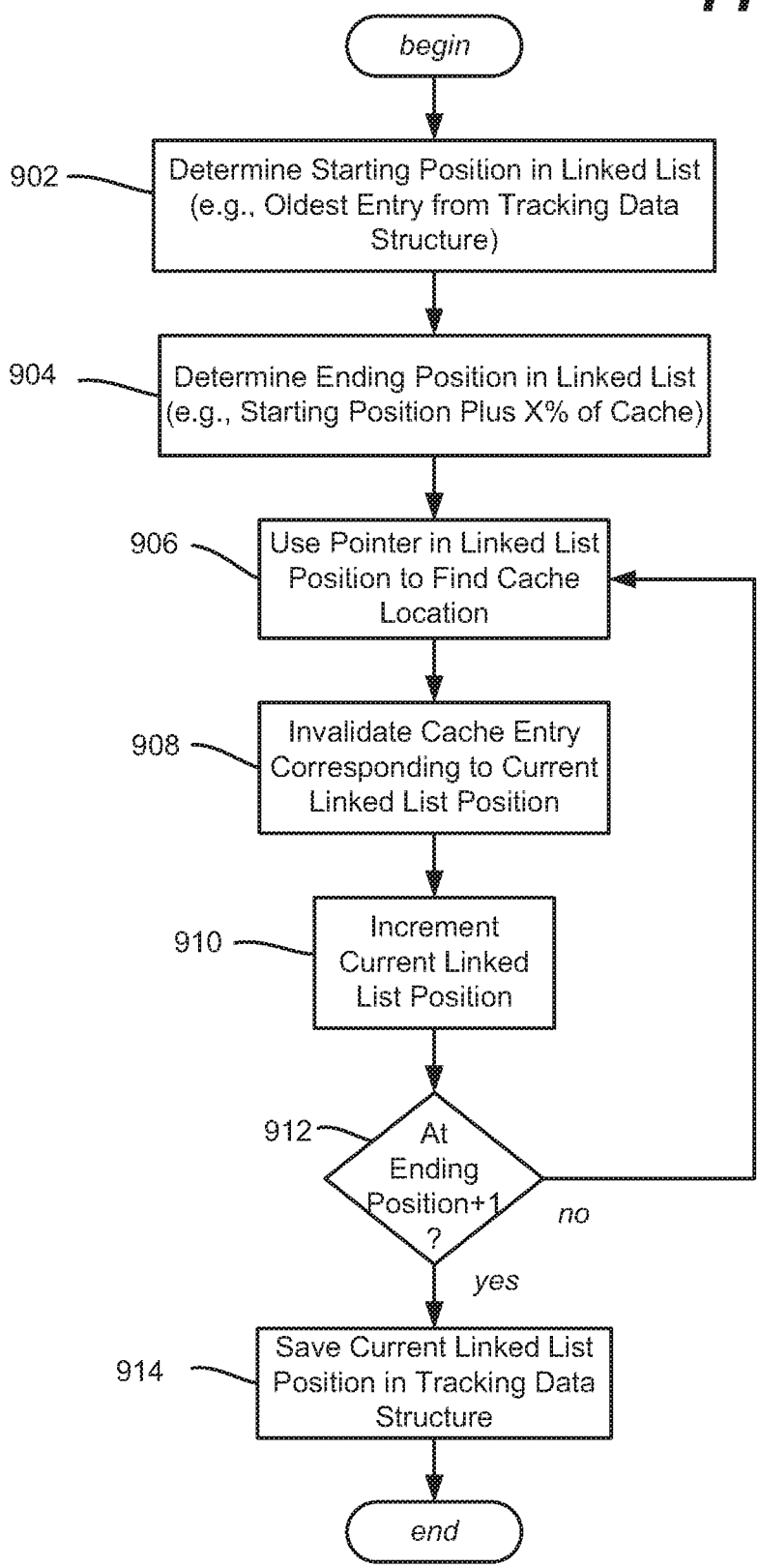
FIG. 9 is a flow diagram showing example steps that may be taken by cache data invalidator logic to invalidate any cache data entries within a certain range of the cache, such as the oldest X percent, according to one or more example implementations.

FIG. 9 represents example logic of a cache data invalidator when running in an implementation in which a cached data entry is invalidated if within some range of data entries, e.g., a percentage of the total cache entries, regardless of expiration values. Instead of a percentage, some other limit may be used, e.g., invalidate the oldest one-thousand data entries in the cache. Again, the starting position in the linked list may be something other than the oldest position, and determined in any manner, however in this example of FIG. 9 the starting position corresponds to the oldest cache entry, e.g., as tracked by the cache data invalidator logic as a position (node pointer) in the linked list.

Step 906 uses the cache pointer in the linked list at the current position to find the cache location, which is invalidated at step 908. Step 910 moves to the next node/ increments the current linked list position, (including wrapping back to the start of the linked list if appropriate).

Step 912 evaluates whether the current linked list position is past the ending position computed at step 904. If not, the process loops back, invalidating until cached data corresponding to the ending position is invalidated, with the linked list position incremented to the next node beyond this ending position.

When past the ending position, the invalidation process saves the current linked list position (e.g., a reference to the node) in the tracking data structure 330, as this position now represents the oldest data entry, and the invalidation process ends.

As can be seen, the use of a tracking data structure that maintains the order of entries into a hash-mapped cache provides for rapid invalidation of a desired set of cache entries, e.g., those that are expired. As a result, a separate process can efficiently perform invalidation, whereby in many scenarios cached data may be returned without having to perform an expiration check. The invalidation process may be configured to run as desired, including with fixed or variable recurring timing based upon any suitable criterion or criteria.

One or more aspects are directed towards maintaining information representative of hash-mapped cache locations of a hash-mapped cache, in which the information tracks a sequential order of entering data into each hash-mapped cache location. An invalidation run is performed on at least part of the hash mapped cache, including using the information representative of the hash-mapped cache locations to invalidate data in one or more hash-mapped cache locations.

Performing the invalidation run may include using the information to invalidate a set of cache data entries that are expired. This may include stopping the invalidation run when the information points to a hash-mapped cache location having a cache data entry that is not expired. Performing the invalidation run may include using the information to invalidate a set of cache data entries that are expired or will be expired within a certain time, using the information to invalidate a set of cache data entries that are within an expiration time window and/or using the information to invalidate a set of cache data entries based upon a number of cache entries or a fraction of total cache entries. Performing the invalidation run may include triggering the invalidation run based upon one or more criteria.

Maintaining the information representative of the cache locations may include maintaining a doubly linked list having a plurality of nodes, including maintaining a node for each cache location having valid data, each node including one node pointer to a next node, a cache pointer to its corresponding cache location in the hash-mapped cache, and another node pointer to a previous node. Maintaining the information representative of the cache locations may include maintaining a linked list having a plurality of nodes, including maintaining a node for each cache location having valid data, each node including a node pointer to a next node and a cache pointer to its corresponding cache location in the hash-mapped cache.

Performing the invalidation run may include a) selecting a node representing an oldest position in the in the sequential order as a currently selected node, b) using the cache pointer in the currently selected node to find a corresponding cache location, c) determining if the cache data entry at the corresponding cache location is expired, and if not, advancing to step f), d) invalidating the cache data entry at the corresponding cache location, e) using the node pointer in the currently selected node to select a next node as the currently selected node and returning to step b), f) maintaining information of the currently selected node to represent the oldest position in the in the sequential order, and ending the invalidation run.

Also described is receiving a request to access data in the hash-mapped cache, performing a hash computation based upon at least part of the request to determine a location in the hash-mapped cache, and if data exists in the location, returning the data from the location, without checking for expiration of that data, in response to the request. Alternatively, upon receiving a request to access data in the hash-mapped cache, described is performing a hash computation based upon at least part of the request to determine a location in the hash-mapped cache, and if data exists in the location and is not expired, returning the data from the location in response to the request.

One or more aspects are directed towards a hash-mapped data cache containing data entries, a tracking data structure that maintains an order of locations of the data entries as entered into the hash-mapped data cache, and an invalidator, the invalidator configured to access the tracking data structure to invalidate a set of one or more data entries based upon an expiration value associated with each data entry and the order that the data entries were entered into the cache.

The tracking data structure may comprise a doubly linked list of nodes having cache pointers to locations of the data entries in the hash mapped data cache, or alternatively may comprise a singly linked list of nodes having cache pointers to locations of the data entries in the hash mapped data cache.

The hash-mapped data cache may comprise an in-memory cache. A request handler may request data from the hash-mapped data cache, including data that is expired based on an associated expiration value but has not yet invalidated by the invalidator.

The invalidator may comprise an asynchronous process. The invalidator may be triggered at a rate that is selectable so as to not impact performance of data lookup in the hash-mapped data cache or to reduce any impact of the performance of the data lookup in the hash-mapped data cache.

One or more aspects are directed towards a) maintaining a hash-mapped cache with locations for cached data, b) maintaining a linked list having a plurality of nodes, including maintaining a node for each cache location having valid data, each node including a node pointer to a next node and a cache pointer to its corresponding cache location in the hash-mapped cache, in which the linked list node order corresponds to an order of entering data into the hash-mapped cache locations, c) performing an invalidation run, including selecting a starting node as a currently selected node. d) using the cache pointer in the currently selected node to find a corresponding cache location, e) determining if the cache data entry at the corresponding cache location is to be invalidated, and if not, advancing to step h), f) invalidating the cache data entry at the corresponding cache location, g) using the node pointer in the currently selected node to select a next node as the currently selected node and returning to step d), h) ending the invalidation run.

Determining if the cache data entry at the corresponding cache location is to be invalidated may include determining if the cache data entry is expired based on an expiration value associated therewith. Determining if the cache data entry at the corresponding cache location is to be invalidated may include determining if the cache data entry is a) expired or soon to be expired based on an expiration value associated therewith, b) corresponds to data entered within a specified time window, c) based upon a number of cache entries or d) based upon a fraction of total cache entries.

Performing the invalidation run may comprise triggering the invalidation run based upon one or more criteria.

Further described is handling requests for data from the cache, independent of the invalidation run, including returning data from the cache that is expired based on an associated expiration value but has not yet invalidated by the invalidator.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 10 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
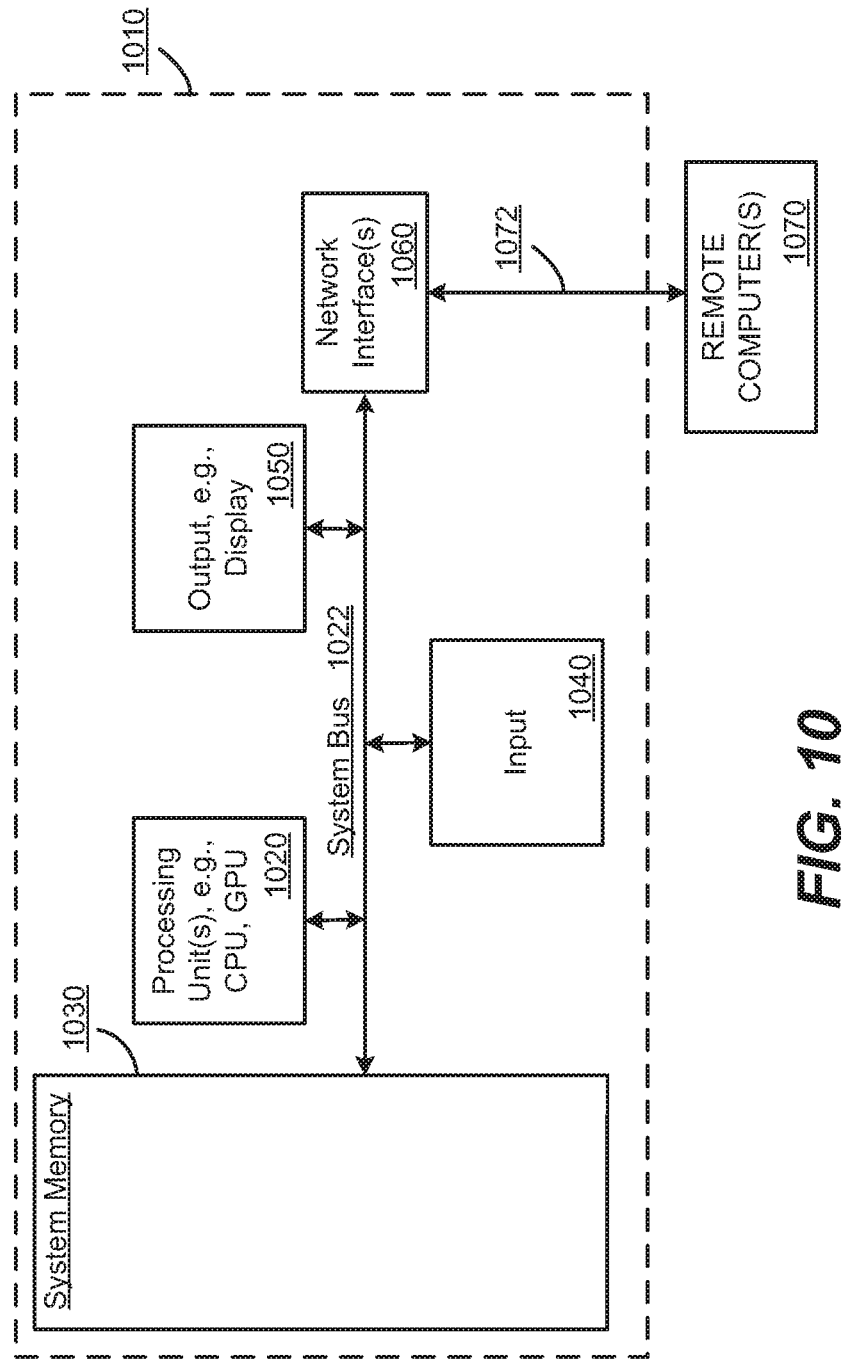
FIG. 10 is a block diagram representing an example computing environment into which aspects of the subject matter described herein may be incorporated.

FIG. 10 thus illustrates an example of a suitable computing system environment 1000 in which one or aspects of the implementations described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the example computing system environment 1000.

With reference to FIG. 10, an example device for implementing one or more implementations includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of machine (e.g., computer) readable media and can be any available media that can be accessed by a machine such as the computer 1010. The system memory 1030 may include computer storage media in the form of volatile and/or nonvolatile memory such as read only memory (ROM) and/or random access memory (RAM), and hard drive media, optical storage media, flash media, and so forth. By way of example, and not limitation, system memory 1030 may also include an operating system, application programs, other program modules, and program data.

A user can enter commands and information into the computer 1010 through one or more input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
   maintaining information representative of hash-mapped cache locations of a hash-mapped cache, in which the information tracks a sequential order of entering data into the hash-mapped cache locations;
   performing an invalidation run on at least part of the hash mapped cache, including using the information representative of the hash-mapped cache locations to invalidate data corresponding to oldest data, in the one or more hash-mapped cache locations, based on the sequential order;
   receiving a request to access requested data in the hash-mapped cache;
   performing a hash computation based upon at least part of the request to determine a location in the hash-mapped cache; and
   in response to determining that the requested data exists in the location and is not invalidated, returning the requested data from the location in response to the request without checking whether the requested data is expired.

2. The method of claim 1 wherein performing the invalidation run comprises invalidating a set of cache data entries that are expired.

3. The method of claim 1 wherein performing the invalidation run comprises invalidating at least one cache data entry that is expired and at least one cache data entry that is about to expire.

4. The method of claim 1 wherein performing the invalidation run comprises invalidating a percentage of the cache corresponding to oldest data based on the sequential order.

5. The method of claim 1 wherein performing the invalidation run comprises invalidating a cache data entry that is expired based on a timestamp associated with the cache data entry.

6. The method of claim 1 wherein performing the invalidation run comprises invalidating a cache data entry that is expired based on a time-to-live value associated with the cache data entry.

7. The method of claim 1, wherein performing the invalidation run comprises triggering the invalidation run based upon one or more criteria.

8. A system comprising:
   a hash-mapped data cache containing data entries;
   a tracking data structure that maintains an order of locations of the data entries as entered into the hash-mapped data cache;
   an invalidator, the invalidator configured to access the tracking data structure to invalidate a set of one or more data entries based upon a time-based expiration value associated with each data entry and the order that the data entries were entered into the cache; and
   a request handling process that:
     receives a request to access requested data in the hash-mapped cache,
     performs a hash computation based upon at least part of the request to determine a location in the hash-mapped cache,
     evaluates whether the requested data exists in the location and is not invalidated, and
     if the requested data exists in the location and is not invalidated, returns the requested data from the location in response to the request without checking whether the requested data is expired.

9. The system of claim 8 wherein the tracking data structure comprises a doubly linked list of nodes having cache pointers to locations of the data entries in the hash mapped data cache.

10. The system of claim 8 wherein the invalidator comprises an asynchronous process.

11. The system of claim 8 wherein at least one time-based expiration value comprises a timestamp.

12. The system of claim 8 wherein at least one time-based expiration value comprises a time-to-live value.

13. The system of claim 8, wherein the tracking data structure comprises a singly linked list of nodes having cache pointers to locations of the data entries in the hash mapped data cache.

14. One or more machine-readable storage media having machine-executable instructions, which when executed perform operations, the operations comprising:
   a) maintaining a hash-mapped cache with locations for cached data;
   b) maintaining a linked list having a plurality of nodes, including maintaining a node for each cache location having valid data, each node including a node pointer to a next node and a cache pointer to its corresponding cache location in the hash-mapped cache, in which the linked list node order corresponds to an order of entering data into the hash-mapped cache locations;
   c) performing an invalidation run, including selecting a starting node as a currently selected node;
   d) using the cache pointer in the currently selected node to find a corresponding cache location;
   e) determining if the cache data entry at the corresponding cache location is to be invalidated, invalidated, and if not, advancing to step h);
   f) invalidating the cache data entry at the corresponding cache location,
   g) using the node pointer in the currently selected node to select a next node as the currently selected node and returning to step d);
   h) ending the invalidation run;
   i) receiving a request to access requested data in the hash-mapped cache;
   j) performing a hash computation based upon at least part of the request to determine a location in the hash-mapped cache; and
   k) in response to determining that the requested data exists in the location and is not invalidated, returning the requested data from the location in response to the request without checking whether the requested data is expired.

15. The one or more machine-readable storage media of claim 14 wherein determining if the cache data entry at the corresponding cache location is to be invalidated comprises determining if the cache data entry is expired based on a timestamp associated therewith.

16. The one or more machine-readable storage media of claim 14 wherein determining if the cache data entry at the corresponding cache location is to be invalidated comprises determining if the cache data entry is expired based on a time-to-live value associated therewith.

17. The one or more machine-readable storage media of claim 14 wherein performing the invalidation run comprises invalidating at least one cache data entry that is about to expire based on a time-based expiration value associated therewith.

18. The one or more machine-readable storage media of claim 14, wherein the request comprises a first request and requested data comprises first requested data, and wherein the instructions further comprise receiving a second request to access second requested data in the hash-mapped cache, performing a hash computation based upon at least part of the second request to determine a location in the hash-mapped cache, and in response to determining that the second requested data exists in the location and is not invalidated, returning the second requested data from the location in response to the request.

19. The one or more machine-readable storage media of claim 14 wherein selecting the starting node as the currently selected node comprises selecting the oldest node based on the order of entering the data into the hash-mapped cache locations.

20. The one or more machine-readable storage media of claim 14, wherein the operations further comprise triggering the invalidation run based upon one or more criteria.

* * * * *